July 21, 1964 W. B. HERNDON ETAL 3,141,354
TRANSMISSION
Original Filed Sept. 16, 1960 3 Sheets-Sheet 1

INVENTORS
Walter B. Herndon &
BY Howard E. Olsen
R. L. Spencer
ATTORNEY

July 21, 1964  W. B. HERNDON ETAL  3,141,354
TRANSMISSION
Original Filed Sept. 16, 1960  3 Sheets-Sheet 2

INVENTORS
Walter B. Herndon &
BY Howard E. Olsen

L. L. Spencer
ATTORNEY

July 21, 1964    W. B. HERNDON ETAL    3,141,354
TRANSMISSION
Original Filed Sept. 16, 1960    3 Sheets-Sheet 3

INVENTORS
Walter B. Herndon &
BY Howard E. Olsen
ATTORNEY

United States Patent Office 3,141,354
Patented July 21, 1964

3,141,354
TRANSMISSION
Walter B. Herndon, Ann Arbor, and Howard E. Olsen, Plymouth, Mich., assignors to General Motors Corporation, Detroit, Mich., a corporation of Delaware
Continuation of application Ser. No. 56,445, Sept. 16, 1960. This application Mar. 8, 1962, Ser. No. 180,922
12 Claims. (Cl. 74—677)

This invention relates to transmissions, and more particularly to an automatic transmission adapted for use in motor vehicles.

This application is a continuation of our pending patent application Serial No. 56,445, filed September 16, 1960, now abandoned.

An object of this invention is to provide a transmission incorporating planetary gearing and a hydrodynamic torque transmitting member capable of accomplishing transition of drive ratio smoothly and without harsh torque reaction bumps.

Another object of this invention is to provide a transmission incorporating two planetary gearing units and a hydrodynamic torque transmitting member incorporating an impeller and a pair of turbines wherein the transmission power delivery shaft in one drive ratio is driven at the torque multiplication of one gear unit and the hydrodynamic torque transmitting device, at a second drive ratio is driven mechanically through the torque multiplication of a second gear unit only, and in a third drive ratio is driven through the hydrodynamic torque transfer unit and the second gear unit with the second gear unit locked up for direct drive and the hydrodynamic torque transfer unit functioning as a fluid coupling rather than a hydraulic torque converter.

A further object of this invention is to provide a transmission having two planetary gearing units and a hydrodynamic torque transmitting unit incorporating an impeller and two turbine members wherein one of the turbines is mechanically connected to a sun gear of one gear unit and wherein the second turbine, the planet carriers of each gear unit and the power delivery shaft are all connected together for rotation as a unit.

An additional object of this invention is to provide in a transmission of the class described a housing having a pair of support webs having axially extending support members thereon wherein the power input shaft is supported for rotation both within and on the external surface of one of the support members, wherein a brake sleeve shaft fixed to a sun gear of one planetary unit is supported for rotation in the other of said support members, wherein a hollow sleeve shaft fixed to one turbine of a hydrodynamic torque transmitting unit and to the planet carriers of first and second gear units extends through and is rotatably supported in the brake sleeve shaft, and wherein an additional shaft driven by another turbine and fixed to a sun gear of a second planetary gearing unit extends through the aforementioned hollow sleeve shaft and is piloted at one end in an engine driven power input shaft and at the other end in the final power delivery shaft.

A further object of this invention is to provide in a transmission having a sun gear carried by a shaft and having spline teeth on the shaft and gear capable of limited angular rotation with respect to each other, an anti-rattle device capable of maintaining the spline teeth out of physical contact with each other through a predetermined angular rotation of the spline teeth with respect to each other.

Another object of this invention is to provide in a transmission an impeller and a first turbine having blades thereon disposed axially in the direction of the transmission main shaft and perpendicular to the plane of rotation thereof wherein the blades of the turbine and impeller are recessed in the inner portion of the parting zone thereof to receive a second turbine and wherein the blades of the second turbine are disposed at an angle to the plane of rotation thereof and are provided with a lip portion extending parallel to the blades of the impeller and first turbine.

These and other objects of this invention will be apparent from the following description and claims taken in conjunction with the following drawings, in which:

Figure 1:
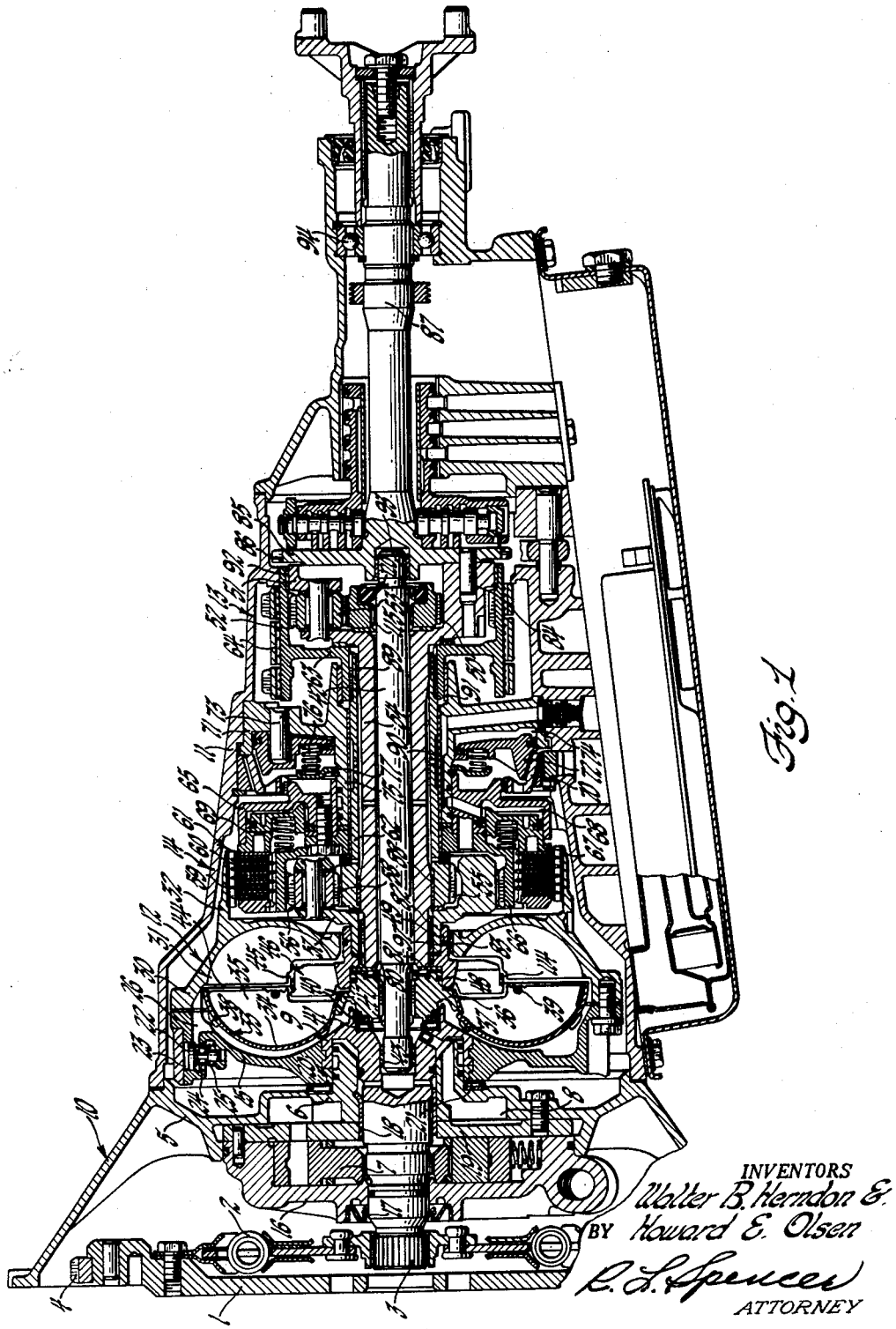
FIGURE 1 is a sectional view through a transmission constructed in accordance with the principles of this invention.

Referring to FIGURE 1 there is shown a transmission 10 having an outer case 11, a hydrodynamic torque transmitting unit 12, a first gear unit 13 and a second gear unit 14.

An engine driven flywheel 1 is connected to drive a power input shaft 3 by means of a vibration dampener 2. A gear 4 on flywheel 1 may be engaged by an engine starter, not shown, to start the vehicle engine. A casing web 5 extends radially inwardly and carries an axially extending annular support boss 6. A pump 7 driven by shaft 3 delivers oil under pressure to a channel 8 in boss 6 when shaft 3 is driven by the engine, not shown. Shaft 3 extends through boss 6 and is shaped at one end to provide an axially extending annular flange support 9 overlying the exterior surface of boss 6 and adapted to receive a torus cover 15. Boss 6 on web 5 therefore supports power input shaft 3 both internally and externally of the boss and rotatably supports torus cover 15. A pump cover 16 bolted to web 5 carries an oil seal 17 and also provides support for input shaft 3. A bushing 18 is disposed between shaft 3, boss 6 and a pump port plate 19 for support purposes. A torus cover insert ring 20 rides on the external surface of boss 6 and rotates with torus cover 15. A roller bearing assembly 21 is disposed between web 5 and the end of the torus cover 15 to absorb thrust. Torus cover 15 is driven by shaft 3 at engine speed and carries a series of dump valves 22, one of which is shown. Fluid pressure may be admitted to a chamber 23 to cause valve 22 to block off an exhaust port 24 to prevent exhaust of fluid from the interior of cover 15. If chamber 23 is connected to exhaust, a spring 25 and centrifugal force will cause valve 22 to connect chamber 26 to exhaust, through exhaust port 24.

A driving torus or impeller 30 having a series of vanes 31 and a clutch drum 32 is bolted to torus cover 15 for rotation therewith. Vanes 31 in clutch drum 32 are cast integrally with driving torus 30. A driven torus assembly or turbine 33 is composed of a semi-torus shell 34, a series of vanes 35 and a hub 36. Vanes 35 are provided with tabs 37 and 38 which may be inserted through suitable slots (not shown) in shell 34 and rolled over on the outer surface of the shell. A support ring 39 supports vanes 35 at the open edge of the vanes. Vanes 35 may also be brazed to shell 34 to form a unitary assembly of the vanes and shell. Shell 34 is brazed to a hub 36. A thrust race 40 carried by hub 36 cooperates with a roller bearing 41 disposed between race 40 and the end of shaft 3 to absorb thrust. Hub 36 is splined to a transmission main shaft 42 supported for rotation in power input shaft 3 by a bushing 43. It will be noted that the vanes 31 and 35 are shaped to provide outer and inner parting zones indicated at 44 and 45. In the outer parting zone 44 the edges of the vanes 31 are disposed closely adjacent to the edges of vanes 35. In the inner parting zone 45, the edges of vanes 31 and 35 are recessed to provide an open space adapted to receive a second turbine 46. Vanes 31 and 35 are flat metal vanes which extend axially in the dirction of transmission main shaft 42 and perpendicular to the plane of rotation of the torus cover 15 and drive torus 30. Turbine 46 is composed of an assembly of blades 47 and a hub 48 having an axially extending support boss 49 thereon.

A first gear unit 13 is composed of a sun gear 50, planet carrier 51, a ring gear 52 and a plurality of planet gears 53 in mesh with sun gear 50 and ring gear 52. A hollow sleeve shaft 54 formed integrally as part of planet carrier 51 is splined to hub 48. Second gear unit 14 is composed of a sun gear 55, a ring gear 56, planet carrier 57 and a plurality of planet gears 58. A series of clutch discs 60 are axially slidable on ring gear 56 and rotatable with the ring gear. A series of clutch discs 59 are axially slidable on clutch drum 32 and are driven by the clutch drum. The drive and driven clutch discs comprise an engageable and releasable clutch indicated generally at 61. Sun gear 55 is provided with a hollow sleeve extension 62. A brake drum 63 formed integrally with ring gear 52 is splined to sleeve shaft 62 so that ring gear 52 and sun gear 55 rotate as a unit. A brake 64 may be applied to drum 63 to prevent rotation of ring gear 52 and sun gear 55. Brake 64 may be applied to drum 63 in any suitable manner as, for example, a fluid pressure operated servo operating through suitable linkage, not shown. A rotatable cylinder 65 bolted to an extension 66 of ring gear 56 has a clutch actuating piston 67 disposed therein adapted to engage clutch 61 when fluid pressure is admitted to a chamber 68. A clutch release spring 69 seated upon extension 66 and piston 67 assures complete release of clutch 61 upon release of fluid pressure from chamber 68. A conical brake member 70 is splined to cylinder 65 for axial motion with respect to cylinder 65 and is rotatable therewith. A cylinder 71 fixed to housing 11 contains a piston 72 pinned to the cylinder for axial motion and to prevent rotation of the piston by means of a pin 73. Piston 72 is effective to force brake member 70 against a conical backing member fixed to housing 11 to prevent rotation of ring gear 56 when fluid pressure is admitted to a chamber 74. An axially extending hollow support boss 75 on cylinder 71 supports ring gear 56 and cylinder 65. A brake release spring 76 seated upon a spring seat 77 carried by boss 75 and upon piston 72 assures complete release of the piston from brake 70 upon release of fluid pressure from chamber 74.

A roller bearing 80 is disposed between one edge of hub 36 and a thrust race 81 which bears against one end of sleeve shaft 54 and against hub 48. Hub 48 is supported at one side on hub 36 and on the opposite side with the portion 49 supported on the axial extension 82 of planet carrier 57. Torus member 30 is rotatably supported upon extension 49 of hub 48 by means of a bushing 83. Since turbine hub 48 and carrier 57 are each splined to shaft 54, the turbine 46, carrier 57 and carrier 51 all rotate as a unit. Planet carrier 51 is connected to an upstanding flange 85 on power delivery shaft 87 by means of a pin 84 for rotation therewith as a unit. A gear 86 on flange 85 may receive a parking brake pawl or ratchet, not shown, to lock shaft 87 against rotation when the transmission is conditioned for "Park." Sleeve shaft 62 is supported for rotation on shaft 54 by spaced bushings 88 and 89, and is supported on boss 75 of casing web 71 by means of bushings 90 and 91. A bushing 92 supports brake drum 63 on planet carrier 51. Shaft 42 is piloted in one end of output shaft 87 by means of a bushing 93. Shaft 87 is rotatably supported in housing 11 by a roller bearing 94.

Figure 2:
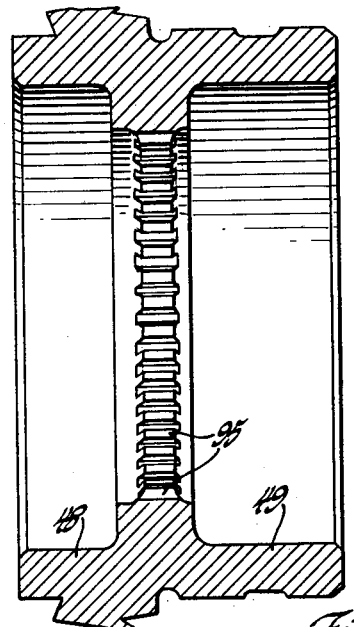
FIGURE 2 is a sectional view through a hub for one of the turbines of the transmission.
Figure 3:
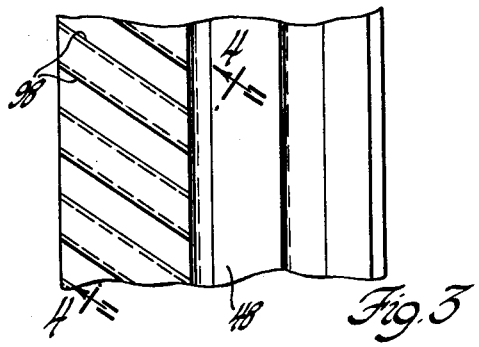
FIGURE 3 is a top plan view of the hub shown in FIGURE 2 illustrating the blade receiving slots in the hub.
Figure 4:
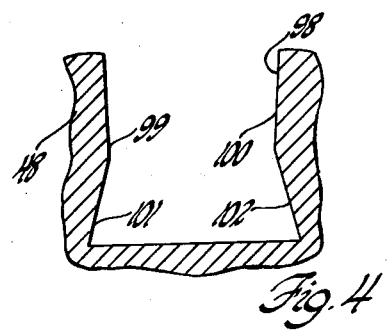
FIGURE 4 is an enlarged sectional view of the slot shown in FIGURE 3, taken along the line 4—4 of FIGURE 3.

As heretofore stated, the vanes 31 and 35 of impeller 30 and turbine 33 are straight vanes disposed in the assembly perpendicular to their plane of rotation and extending axially in the direction of main shaft 42. As shown in FIGURES 2 through 4, hub 48 carries a series of splines 95 adapted to cooperate with splines on sleeve shaft 54 of FIGURE 1. Portion 49 is recessed to receive an oil seal ring 97 shown in FIGURE 1. A series of slots 98 shown in FIGURE 3, are provided to receive the base of vanes 47. Slots 98 are cut in hub 48 at an angle of 34° to the plane of rotation of the hub and to the axis of rotation of the hub. As shown in FIGURE 3, the angle of slots 98 is 34 degrees to the axis of rotation of the hub. Slots 98 each have substantially parallel side walls 99 and 100 extending inwardly from the outer extremity of the slot, part-way inwardly toward the base of the slot. Side walls 99 and 100 are cut back or recessed in the portion thereof adjacent the base of the slot as indicated at 101 and 102 to form a dovetail adapted to receive the base of blade 47.

Figure 5:
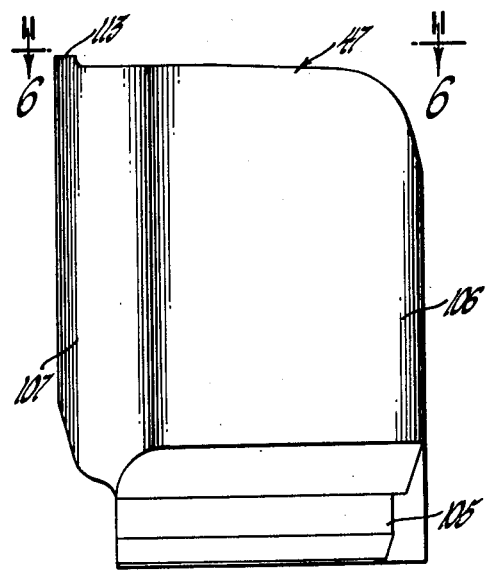
FIGURE 5 is a side elevation of one of the blades of one of the turbines adapted to be carried by the hub illustrated in FIGURES 2 through 4.
Figure 6:
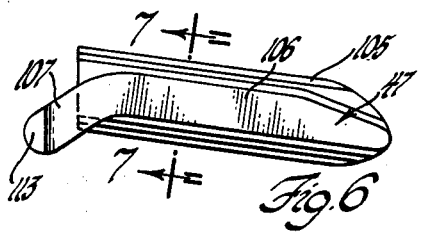
FIGURE 6 is a top plan view of the blade shown in FIGURE 5.
Figure 7:
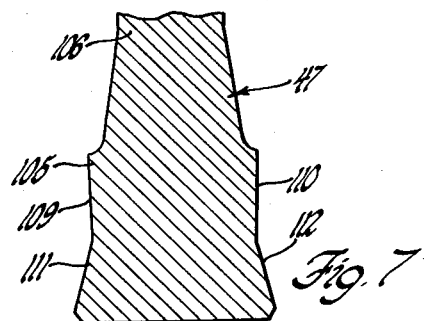
FIGURE 7 is an enlarged view taken along the line 7—7 of FIGURE 6.

As shown in FIGURES 5 through 7, vane 47 includes a base portion 105 and an upstanding blade portion 106 having a lip 107 bent at an angle to straight blade portion 106. Slot 98 of hub 48 is cut at an angle of 34 degrees as stated. Lip 107 of vane 47 is bent at an angle of 34 degrees to the plane containing the main straight blade portion 106 as particularly shown in FIGURE 6. In the assembly of the vane 47 to the hub, the vane portion 106 therefore lies at an angle of 34 degrees to the plane of rotation of the hub, while lip 107 extending outwardly beyond the edge of the hub extends parallel to the vanes 35 of turbine 34. As shown in FIGURE 7, the base 105 of vane 47 includes substantially parallel side wall portions 109 and 110 and outwardly diverging wall portions 111 and 112 adapted to be received by the portions 99–100 and 101–102 of hub 48. An annular support ring 114 shown in FIGURE 1 fits over the outer edge of the blade assembly into contact with an upstanding lip 113 formed on the vanes.

Figure 8:
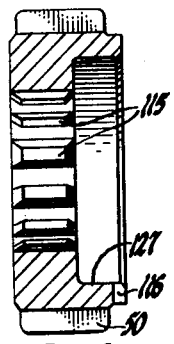
FIGURE 8 is a sectional view through one of the sun gears of the transmission taken along the line 8—8 of FIGURE 9.
Figure 9:
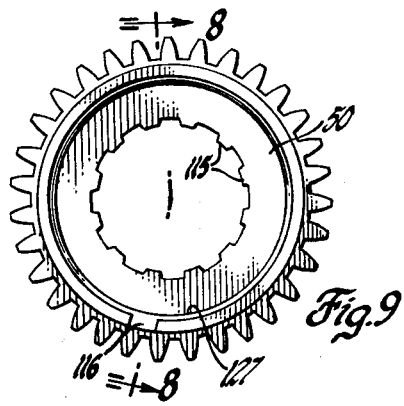
FIGURE 9 is an end view of the sun gear shown in FIGURE 8.
Figure 10:
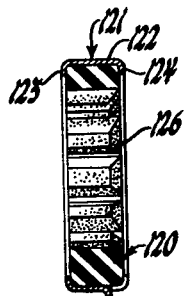
FIGURE 10 is a sectional view of an anti-rattle or damper device taken along the line 10—10 of FIGURE 11 and adapted for use in connection with the sun gear shown in FIGURES 8 and 9.
Figure 11:
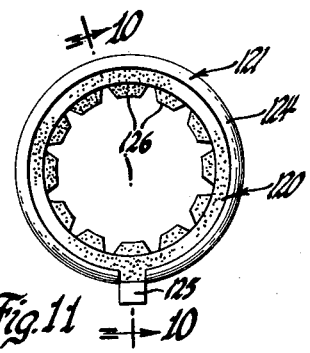
FIGURE 11 is an end view of the damper device shown in FIGURE 10.
Figure 12:
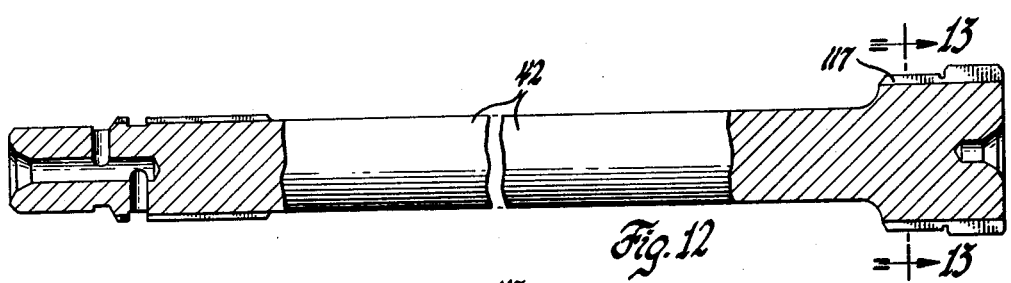
FIGURE 12 is a partially sectional view through a shaft adapted to receive the sun gear shown in FIGURES 8 and 9 and the anti-rattle device shown in FIGURES 10 and 11.
Figure 13:
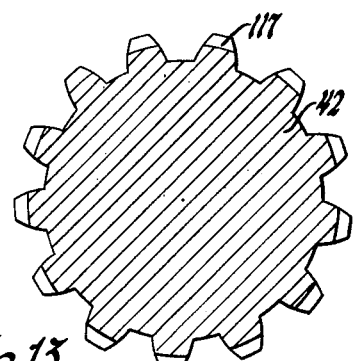
FIGURE 13 is a sectional view taken along the line 13—13 of FIGURE 12.

In the assembly of sun gear 50 to transmission mainshaft 42, sun gear 50 is splined to the mainshaft. As shown in FIGURE 8 twelve splines 115 are provided on the internal surface of the gear. A slot 116 shown particularly in FIGURES 8 and 9 is cut in the gear hub side wall, the slot being located on the center of a spline tooth as shown. The splines formed on gear 50 comprise 12 teeth, 10 diametral pitch, 27° pressure angle, 1.0692 base circle diameter. The minimum effective space width allowable is .1932 while the maximum effective allowable space width is .1953. The minimum dimension for space width is .1945 while the maximum allowable dimension for space width is .1955. Referring to FIGURES 12 and 13 which show the splines 117 on transmission shaft 42 adapted to receive the sun gear splines 115, the number of teeth, diametral pitch, pressure angle and base circle diameter are the same as those of the splines on gear 50. The minimum effective tooth thickness is .1198, maximum effective tooth thickness is .1225, minimum dimension, tooth thickness .1193 and maximum allowable tooth thickness .1215. It will be apparent that with the sun gear assembled on shaft 42, the sun gear splines 115 and shaft splines 117 will mate loosely due to manufacuring tolerances. It has been found that, particularly when operating in second gear drive with the hydrodynamic torque transmitting device emptied of working fluid, a rattle occurs in gear unit 13 due to the play between these splines. In order to minimize this rattle, a resilient damper 120 shown particularly in FIGURES 10 and 11 is assembled to sun gear 50. Damper 120 is made up of an assembly of an annular U-shaped metallic retainer 121 having an annular base 122 and a pair of bent over side walls or flanges 123 and 124. An upstanding ear or tang 125 is struck up from the base 122. A resilient damper 120 having splines 126 formed thereon is disposed within metallic retainer 121 between the base 122 and side walls 123 and 124, the resilient damper being bonded to the metallic retainer. In the assembly of the resilient damper to the retainer, the tang 125 is disposed such that the center of the tang is disposed on the center of one of the spline teeth as particularly shown in FIGURE 11. This facilitates the assembly of the damper to the sun gear 50. In assembling the damper to the gear, retainer 121 is press fitted to an axially extending annular boss or extension 127 on gear 50 best shown in FIGURE 8, so that the retainer cannot move with respect to the gear. Tang 125 fits into slot 116 of gear 50 so that the splines 126 align with splines 115. The resilient member 120 contains 12 splines 126 having the same diametral pitch, pressure angle, and base circle diameter as the splines on shaft 42 and gear 50. In the case of the splines on the resilient member 120, however, the minimum permissible effective space width is .1107, maximum effective space width is .1132, the minimum dimension space width is .1099 and the maximum dimension space width is .1124. It will be apparent therefore, that with the gear and dampener assembly disposed on the splines 117 of shaft 42, the resilient splines serve to tend to center the gear splines with respect to those of shaft 42 such that the side walls of the gear splines are spaced from the side walls of the splines on the shaft. In the event that a load is applied to gear 50, the resilient dampener 120 will yield to permit the side walls of splines 115 to contact the side walls of splines 117 so that the shaft drives the gear. In the event no load is applied to gear 50, the resilient dampener serves to space the side walls of the metal splines on the gear and shaft from each other to prevent rattle. The dampener is particularly effective when operating in second gear to prevent rattle. The tang 125 and slot 116 automatically align the splines on gear 50 and resilient member 120, thereby facilitating the mounting of the gear and dampener assembly on shaft 42. When operating in second gear, the dampener permits approximately thirty degrees of rotation of the gear 50 with respect to shaft 42 in either direction before metal to metal contact of the splines on the shaft and gear occurs. In effect, the working pitch diameter of the dampener splines is greater than those of shaft 42 but less than that of the splines of gear 50, so that the dampener centers the splines of the gear out of contact with those of the shaft when no load is applied to the gear. When torque is applied to shaft 42, the shaft rotates through a limited angular rotation with respect to the gear to permit the side walls of the gear splines to mesh with the side walls of the shaft splines.

Referring to FIGURE 1, the transmission, in operation, is adapted to provide three forward drive ratios including low, second and high or direct drive plus reverse. For low or first gear drive, hydrodynamic torque transmitting unit 12 is filled with working fluid and brake 64 is applied to drum 63 to prevent rotation of ring gear 52. At engine idle, with the vehicle stopped, planet carrier 51 will be held against rotation due to the load of the vehicle on shaft 87. Driving torus 30 will be driven at engine speed, but turbines 33 and 46 will remain stationary. As the torus 30 is speeded up, turbine 33 will initially drive sun gear 50 through transmission mainshaft 42 and cause planet carrier 51 and shaft 87 to rotate forwardly in the reduction of gear unit 13. Turbine 46 will likewise rotate forwardly in reduction drive at the speed of rotation of output shaft 87. In this stage of operation turbine 46 functions as a forwardly rotating reaction member to re-direct fluid delivered by turbine 33 to the impeller blades 31 so that the re-directed fluid entering impeller 30 will tend to rotate the impeller forwardly. In this drive ratio the hydrodynamic torque transmitting unit functions as a hydraulic torque converter so that output shaft 87 is driven partially by mechanical torque multiplication of gear unit 13 and partially by the torque multiplication of unit 12.

For second gear drive, unit 12 is emptied of fluid, brake 64 remains engaged, and clutch 59–60 is engaged. Shaft 87 is driven entirely mechanically at the drive ratio of gear unit 14. For direct drive, clutch 59–60 remains engaged, and unit 30 is re-filled with fluid, while brake 54 is released. In direct drive, turbine 47 no longer functions as a torque converter reaction member, but rather functions as a second turbine.

The arrangement of the gearing, in combination with the two turbine hydrodynamic units 12 with the two turbines and the specific shafting assembly of shafts 42, 54 and 62 provides a very compact three speed transmission capable of hydraulic torque multiplication in low gear drive, mechanical drive in second gear, and split mechanical drive and hydraulic drive in high gear. The anti-rattle device 120 prevents gear rattle in gear unit 13 when hydraulic unit 12 is empty of working fluid. The housing support flanges 6 and 71 provide for a rigid assembly of the rotating parts capable of a long and useful life. The lip 107 on blades 106 is provided to cause the turbine 47 to act as a turbine rather than a converter reaction member at a relatively low rotating speed. The lip 47 will receive fluid from turbine 35 on the rear side of the lip so that the working fluid will, at a relatively low speed of rotation of turbine 47 tend to drive member 47 forwardly in the direction of rotation of turbine 35 rather than reversely. Thus, turbine 47 only initially functions as a converter reaction member, and at a relatively low speed of rotation functions as a second fluid coupling turbine member.

Blades 47 of turbine 46 are disposed in the recess 45 between blades 31 and 35 at the inner radial zone of fluid flow and extend across the parting zone 44 wherein the edges of blades 31 and 35 are disposed closely adjacent to each other. By placing the blades 47 in the inner radial zone as shown and providing lip 107 thereon extending axially and parallel to blades 35 into close proximity to the blades 45, turbine 46 functions as a converter reaction member only at low rotative speeds and quickly receives fluid on the rear surface of lip 107 and blades 47 to change its function to that of an impeller. This provides hydrodynamic torque multiplication for start, but improves efficiency when operating in direct drive.

We claim:
1. In a transmission, a hydrodynamic torque transmitting device and first and second planetary gearing units, said hydrodynamic torque transmitting device including an engine driven impeller and first and second turbine members, said planetary gearing units each including a planet carrier supporting a plurality of planet pinion gears in mesh with a ring gear and a sun gear, means connecting said first turbine to the sun gear of said first gear unit for driving the same, means connecting said second turbine to the planet carriers of both of said gear units for rotation therewith as a unit, an engageable and releasable brake effective when engaged to prevent rotation of the ring gear of said first gear unit and the sun gear of said second gear unit, and an engageable and releasable clutch effective when engaged to connect the ring gear of said second gear unit to said engine.

2. In a transmission, a hydrodynamic torque transmitting device of the type adapted to be alternately filled with and emptied of working fluid, said torque transmitting device including an engine driven impeller and first and second turbines, first and second planetary gearing units each including a planet carrier supporting a plurality of planet pinion gears in mesh with a ring gear and a sun gear, means connecting said first gear unit sun gear to said first turbine for rotation therewith, means connecting said second turbine to both of said planet carriers for rotation therewith as a unit, a final power delivery shaft connected for rotation with the planet carriers and second turbine, means connecting the ring gear of said first gear unit to the sun gear of said second gear unit for rotation therewith, an engageable and releasable brake effective when engaged and said hydrodynamic torque transmitting unit is filled with working fluid to prevent rotation of said first gear unit ring gear to establish low-gear drive through said first gear unit, an engageable and releasable clutch for clutching the ring gear of said second gear unit to said engine, said brake and said clutch being engaged and said hydrodynamic torque transmitting unit being emptied of working fluid to establish second gear drive through said transmission, said brake being released, said clutch engaged and said hydrodynamic torque transmitting unit filled with fluid to establish direct drive through said transmission.

3. In a transmission, a transmission housing, first and second support webs on said housing, each web having a hollow axially extending support flange formed thereon at the inner end thereof, an engine driven power input shaft extending through said first flange and rotatably supported therein, an axially extending drive member on said power input shaft and supported for rotation on the outer surface of said first flange, a hydrodynamic torque transmitting unit including an impeller driven by said power input shaft and first and second turbines, a final power delivery shaft supported for rotation in said housing, first and second planetary gearing units, each of said gear units including a planet carrier supporting a plurality of planet pinion gears in mesh with a sun gear and a ring gear, a first hollow sleeve shaft supported for rotation in said second support flange and connecting said first gear unit ring gear to said second gear unit sun gear for rotation therewith, an engageable and releasable brake effective when engaged to prevent rotation of said first hollow sleeve shaft, a second hollow sleeve shaft supported for rotation in said first hollow sleeve shaft, said second hollow sleeve shaft connecting said second turbine, both of said planet carriers and said final power delivery shaft to each other for rotation as a unit, a third hollow sleeve shaft extending through said second hollow sleeve shaft and piloted in said engine driven power input shaft and said final power delivery shaft, said third hollow sleeve shaft connecting said first turbine to said first gear unit sun gear for rotation therewith as a unit, and an engageable and releasable clutch effective when engaged to connect the ring gear of said second gear unit for rotation with said engine driven power input shaft.

4. In a transmission, a hydrodynamic torque transmitting device including an engine driven impeller and first and second turbines, said impeller and said first turbine each having blades extending perpendicular to their plane of rotation and facing each other in close proximity at an outer parting zone, said blades being recessed inwardly of said outer parting zone to receive said second bladed turbine, said second turbine having blades extending across the inner limit of said outer parting zone, first and second planetary gearing units each having a planet carrier supporting a planet pinion gear in mesh with a ring gear and a sun gear, a drive connection connecting said first turbine to said first gear unit sun gear for driving said sun gear, a drive connection connecting said second turbine to both of said planet carriers for rotation therewith as a unit, a final power delivery shaft driven by said first gear unit planet carrier, means connecting said first gear unit ring gear to said second gear unit sun gear for rotation therewith as a unit, a selectively engageable and releasable brake effective when engaged to prevent rotation of said first gear unit ring gear and said second gear unit sun gear, and an engageable and releasable clutch effective when engaged to connect said second gear unit ring gear for rotation with said engine driven power input shaft.

5. In a transmission, a hydrodynamic torque transmitting device including an engine driven impeller and first and second turbines, said impeller and said first turbine each having blades extending perpendicular to their plane of rotation and facing each other in close proximity at an outer parting zone, said blades being recessed inwardly of said outer parting zone to receive a second bladed turbine, said second turbine having blades extending across said recess and disposed at an angle to their plane of rotation to receive fluid from said first turbine and redirect said fluid into said impeller, the blades of said second turbine each having a lip thereon extending perpendicular to the plane of rotation of said second turbine, first and second planetary gearing units each having a planet carrier supporting a planet gear in mesh with a ring gear and a sun gear, means connecting said first turbine to the sun gear of said first gear unit to drive the same, a final power delivery shaft, means connecting said second turbine, both of said planet carriers and said final power delivery shaft to each other for rotation as a unit, means connecting the ring gear of said first gear unit to the sun gear of said second gear unit for rotation therewith as a unit, a selectively engageable brake effective when engaged to prevent rotation of said first gear unit ring gear and said second gear unit sun gear, and an engageable and releasable clutch effective when engaged to connect said second gear unit ring gear to said engine driven impeller for rotation therewith.

6. In a transmission, a hydrodynamic torque transmitting device of the type adapted to be alternately filled with and emptied of working fluid, said device including an engine driven impeller and first and second turbines, said impeller and said first turbine each having blades extending perpendicular to their plane of rotation and facing each other in close proximity at an outer parting zone, said blades being recessed inwardly of said outer parting zone to receive said second turbine, the blades of said second turbine extending across the inner limit of said outer parting zone and having a lip thereon extending perpendicular to their plane of rotation into close proximity to the blades of said first turbine, first and second planetary gearing units each having a planet carrier supporting a planet gear in mesh with a sun gear and a ring gear, means connecting said first turbine to said first gear unit sun gear for rotation therewith, a final power delivery shaft, means connecting said second turbine to both of said planet carriers and said final power delivery shaft for rotation therewith as a unit, means connecting said first gear unit ring gear to said second gear unit sun gear for rotation therewith as a unit, an engageable and releasable brake adapted to be engaged to prevent rotation of said first gear unit ring gear to establish reduction drive through said first gear unit and said hydrodynamic torque transmitting device when said hydrodynamic torque transmitting device is filled with fluid, an engageable and releasable clutch effective when engaged to connect said second gear unit ring gear for rotation with said impeller, said brake and clutch being engaged and said hydrodynamic torque transmitting device being emptied of fluid to establish second gear drive through said second gear unit, said brake being released, said clutch engaged, and said hydrodynamic torque transmitting device filled with fluid to establish direct drive through said transmission.

7. In a transmission, a hydrodynamic torque transmitting device of the type adapted to be alternately filled with and emptied of working fluid, said device including an engine driven impeller and first and second turbines, first and second planetary gearing units each having a planet carrier supporting a pinion gear in mesh with a ring gear and a sun gear, a shaft driven by said first turbine having a set of splines thereon adapted to receive splines on said first gear unit sun gear, said shaft being rotatable through a limited angular rotation with respect to said sun gear before driving the same, an anti-rattle device for preventing rattle of said splines comprising a resilient member fixed to said sun gear and having splines thereon closely mating with the splines of said shaft, said resilient member being normally effective to dispose said sun gear on said shaft with the splines of said sun gear out of physical contact with the splines on said shaft when said hydrodynamic torque transmitting member is emptied of fluid, a final power delivery shaft, means connecting said second turbine, both of said planet carriers and said final power delivery shaft to each other for rotation as a unit, means connecting the ring gear of said first gear unit to the sun gear of said second gear unit for rotation therewith, an engageable and releasable brake effective when engaged to prevent rotation of said first gear unit ring gear and said second gear unit sun gear, and an engageable and releasable clutch effective when engaged to clutch said second gear unit ring gear to said impeller.

8. In a transmission, a hydrodynamic torque transmitting device of the type adapted to be alternately filled with and emptied of working fluid, said device including an engine driven impeller and first and second turbines, first and second planetary gearing units each having a planet carrier supporting a pinion gear in mesh with a ring gear and a sun gear, a shaft driven by said first turbine having a set of splines thereon adapted to receive splines on said first gear unit sun gear, said shaft being rotatable through a limited angular rotation with respect to said sun gear before driving the same, an anti-rattle device for preventing rattle of said splines comprising a resilient member fixed to said sun gear and having splines thereon closely mating with the splines of said shaft, said resilient member being normally effective to dispose said sun gear on said shaft with the splines of said sun gear out of physical contact with the splines on said shaft when said hydrodynamic torque transmitting member is emptied of fluid, a final power delivery shaft, means connecting said second turbine, both of said planet carriers and said final power delivery shaft to each other for rotation as a unit, means connecting the ring gear of said first gear unit to the sun gear of said second gear unit for rotation therewith, an engageable and releasable brake effective when engaged to prevent rotation of said first gear unit ring gear and said second gear unit sun gear, and an engageable and releasable clutch effective when engaged to clutch said second gear unit ring gear to said impeller, said brake being effective when engaged to establish reduction drive through said first gear unit and said hydrodynamic torque transmitting device when said torque transmitting device is filled with fluid, said brake and said clutch being simultaneously engaged to establish second gear drive through said second gear unit when said hydrodynamic torque transmitting device is emptied of working fluid, and said brake being released, said clutch engaged and said hydrodynamic torque transmitting device being filled with fluid to establish direct drive through said transmission.

9. In a transmission, a hydrodynamic torque transmitting device of the type adapted to be alternately filled with and emptied of working fluid, said device including an engine driven impeller and first and second turbines, said impeller and said first turbine each having blades extending perpendicular to their plane of rotation and terminating in close proximity to each other at an outer parting zone, the blades of said impeller being recessed inwardly of said outer parting zone to receive the blades of said second turbine, the blades of said second turbine extending across the inner end of said parting zone at an angle to their plane of rotation and having a lip formed thereon extending perpendicular to the plane of rotation of said blades and disposed in close proximity to the blades of said first turbine, first and second planetary gearing units each having a planet carrier supporting a pinion gear in mesh with a ring gear and a sun gear, a shaft driven by said first turbine having a set of splines thereon adapted to receive splines formed on said first gear unit sun gear, said shaft being rotatable through a limited angular rotation with respect to said sun gear before driving the same, an anti-rattle device for preventing rattle of said splines comprising a resilient member fixed to said first gear unit sun gear and having splines thereon closely mating with the splines on said shaft, said resilient member being normally effective to maintain the splines on said sun gear and said shaft out of physical contact with each other when said hydrodynamic torque transmitting device is emptied of fluid, a final power delivery shaft, a hollow sleeve shaft through which said splined shaft extends for connecting said second turbine and both of said planet carriers to said final power delivery shaft, an additional hollow sleeve shaft through which said first-mentoined hollow sleeve shaft extends for connecting the ring gear of said first gear unit to the sun gear of said second gear unit, an engageable and releasable brake effective when engaged to prevent rotation of first gear unit ring gear and said second gear unit sun gear, said transmission being effective to drive said final power output shaft in reduction drive of said hydrodynamic torque transmitting device and said first gear unit when said brake is applied and said hydrodynamic device is filled with fluid, an engageable and releasable clutch effective when engaged to clutch the ring gear of said second gear unit to said impeller for rotation therewith, said clutch and said brake being simultaneously engaged and said hydrodynamic device emptied of fluid to establish second gear drive through said second gear unit, said clutch being engaged, said brake released and said hydrodynamic device being filled with fluid to establish direct drive of said final power delivery shaft.

10. In a torque transmitting assembly, a first rotatable member comprising a shaft, a second rotatable member comprising a gear supported on said shaft for limited angular rotation with respect to said shaft, a set of splines on each of said members effective when engaged to transmit torque therebetween, the splines of said rotatable members permitting limited angular rotation of said members with respect to each other from a first position wherein said splines are in spaced relation with respect to each other to a second position wherein said splines are engaged, said assembly at times being subjected to a load and at times being operated without loading, means for rotating said rotatable members to said first position when said device is operated in the absence of load to prevent rattle of said splines and for permitting angular rotation of said rotatable members to said second position for transmission of torque through said splines when said assembly is subjected to load, said means comprising an annular ring formed of resilient material, said ring having a body fixed for rotation with said gear and a set of splines formed on said resilient body, splines on said shaft in close mating relationship with said resilient splines on said resilient body, the splines on said resilient body being axially spaced from the splines on said gear.

11. In a torque transmitting assembly, a shaft having splines thereon, a gear having splines thereon intermeshing with the splines of said shaft, said gear and said shaft being capable of limited angular rotation with respect to each other from a first position wherein said splines are spaced from each other when said assembly is operated in the absence of load to a second position wherein said splines are in contact to transmit torque when said assembly is operated under load, means for positioning said gear and said shaft in said first position to prevent rattle of said splines when said assembly is operated in the absence of load, said means comprising a resilient annular member fixed to said gear for rotation therewith and having a set of splines formed thereon and in close mating relationship with splines on said shaft, the splines on said resilient member being disposed axially at one side of the splines of said gear.

12. In a torque transmitting assembly, a shaft having splines thereon, a gear having splines thereon in intermeshing relationship with the splines of said shaft, said intermeshing splines permitting limited angular rotation of said gear and said shaft prior to contact of said splines, an anti-rattle device for preventing rattle of said splines comprising an annular ring of resilient material having splines formed thereon, a metallic ring on said resilient ring, a recess in said gear adapted to receive said anti-rattle device, a slot in the side wall of said gear disposed in axial alignment with one of the upstanding splines of said gear, an upstanding flange on said metallic ring disposed in alignment with one of the upstanding splines on said resilient member, said resilient member being press fitted into the recess in said gear with said tang disposed in said gear slot to align the splines of said resilient member with those of said gear, the splines of said resilient member being in close mating relationship with the splines of said shaft whereby said resilient member is normally effective to dispose said gear on said shaft with the splines of said gear and shaft in spaced relation with respect to each other.

References Cited in the file of this patent

UNITED STATES PATENTS

| | | |
|---|---|---|
| 1,297,835 | Guay | Mar. 18, 1919 |
| 1,636,262 | Troendly | July 19, 1927 |
| 2,505,120 | Jackson | Apr. 25, 1950 |
| 2,961,856 | Selzer | Nov. 29, 1960 |
| 3,008,349 | Winchell et al. | Nov. 14, 1961 |

FOREIGN PATENTS

| | | |
|---|---|---|
| 406,934 | Germany | Dec. 4, 1924 |